United States Patent
Byl et al.

(10) Patent No.: US 7,389,746 B2
(45) Date of Patent: Jun. 24, 2008

(54) VEHICLE-MOUNTED ANIMAL CATCHING AND TRANSPORTING APPARATUS

(76) Inventors: John Byl, 1336 3rd Ave. SE., Sioux Center, IA (US) 51250; Evan Byl, 4132 370th St., Sheldon, IA (US) 51201; Scott Hulstein, 3092 371st St., Sioux Center, IA (US) 51250; Keith Van Voorst, 1107 4th St., Hull, IA (US) 51239

( * ) Notice: Subject to any disclaimer, the term of this patent is extended or adjusted under 35 U.S.C. 154(b) by 0 days.

(21) Appl. No.: 11/324,554

(22) Filed: Jan. 3, 2006

(65) Prior Publication Data
US 2007/0151524 A1 Jul. 5, 2007

(51) Int. Cl.
*A01K 1/00* (2006.01)
(52) U.S. Cl. .................. 119/512; 119/514; 119/519; 119/843
(58) Field of Classification Search .............. 119/512, 119/513, 514, 519, 843, 848, 849, 840, 846; 296/24.31, 3; D30/108
See application file for complete search history.

(56) References Cited

U.S. PATENT DOCUMENTS

| | | | |
|---|---|---|---|
| 3,095,858 A | | 7/1963 | Bauer |
| 3,241,527 A | * | 3/1966 | Burns et al. ................. 119/848 |
| 3,931,796 A | | 1/1976 | Hoffman |
| 4,201,157 A | * | 5/1980 | Lambert ..................... 119/752 |
| 4,228,766 A | * | 10/1980 | Wedman ..................... 119/723 |
| 4,924,813 A | * | 5/1990 | Bixler et al. ................. 119/848 |
| 5,237,960 A | * | 8/1993 | Wilson ....................... 119/514 |
| 5,372,092 A | | 12/1994 | Pederson |
| 6,067,940 A | * | 5/2000 | Holder ....................... 119/512 |

* cited by examiner

*Primary Examiner*—T. Nguyen
(74) *Attorney, Agent, or Firm*—Kent A. Herink; Emily E. Harris (57) ABSTRACT

A calf catching apparatus that attaches to an ATV or similar vehicle and operates along the side of the vehicle. The calf catching apparatus has a pair of doors or gates that open to the front and are operated from ATV. The operator drives along side the cow/calf pair until the calf is inside the pen. The gates are closed and the calf is caught and separated from the cow. The operator can enter into the pen and treat the calf. If the calf needs to be transported, the calf is placed on a transportation platform and a gate is closed to restrain the calf on the platform. The calf catching apparatus can also be transformed to a tow behind version to minimize the width and bring the unit down the road behind a vehicle. There is also a fold-up embodiment that allows for the pen to be folded beside the ATV to reduce the overall width of the ATV and calf catching apparatus for traveling through narrow openings or on roads without unhooking from the ATV. In normal operation, one side of the calf catching apparatus is supported by the ATV and attached to the ATV in a manner that allows the calf catching apparatus to pivot vertically around the center axis of the ATV to allow for proper operation in rough terrain.

9 Claims, 15 Drawing Sheets

VEHICLE-MOUNTED ANIMAL CATCHING AND TRANSPORTING APPARATUS

BACKGROUND OF THE INVENTION

The invention relates generally to apparatus for use in animal husbandry and, more specifically, to a catcher and transporter for calves that is mounted to a vehicle.

Farmers, and particularly ranchers, who have cow-calf operations frequently have the cows in fields or open ranges where calves are given birth. Calves need to be caught in the fields or open ranges soon after birth for the purposes of identification tagging, health procedures, and related processing. They also may need to be caught at a later date for additional treatment or further processing. This requires that a farm or ranch worker be able to select, isolate and restrain the calf, which is free to roam about a large area and naturally tries to avoid capture. The mother cows are very protective of their calves, especially newborns, and often pose a threat to a worker attempting to capture or treat the calf. The present invention provides a safe and effective means to catch the calf, protect the worker from the mother cow while processing the calf, and transport the calf when required.

SUMMARY OF THE INVENTION

The invention consists of a calf catching assembly that is mounted on a ground vehicle for isolating, capturing and retaining an animal. A portable pen is mounted on a side of the vehicle and supported a short distance above the ground. Preferably, one or more wheels are attached to the pen opposite the vehicle to assist in supporting the pen adjacent the ground. The pen has a forward-facing opening through which an animal enters the pen. Once the animal is positioned inside the pen, a door is closed, covering the opening and capturing the animal inside the pen. The invention is particularly suited for dividing off and capturing a calf from a cow-calf pair that are in a pasture or open field. The pen is preferably made of an open-grid material, such as fence panels, so that an operator of the vehicle can easily see animals that are being divided and/or captured by the invention. In addition, the open-grid allows the divided cow to see her captured calf. With her calf in view, the cow will be less stressed by the capture operation and will follow the enclosure if it is transported to a remote location, such as a barn.

In operation, the doors are swung to their open position and the vehicle is directed toward a calf to be captured, typically being closely attended by a mother cow. The operator of the vehicle maneuvers the calf catching assembly to have the calf but not the cow pass through the open doors and into the pen. A latch is tripped and the doors are swing to their closed position thereby trapping the calf inside the pen. If desired, the calf can then be transported to a remote location. Alternatively, animal husbandry procedures may be conveniently conducted on the calf inside the pen essentially where captured.

In an alternative embodiment of the invention, the portable enclosure may be folded from an expanded, working position adjacent the side of the vehicle to a collapsed, transport position rearward of the vehicle to facilitate travel on roads, through gates and the like.

An object of the present invention is to provide a calf catching assembly that is lightweight, inexpensive, durable and easy to operate.

Another object of the invention is to provide a calf catching assembly that is suitable to be transported by an all-terrain vehicle.

These and other objects of the invention will be made apparent to those skilled in the art upon a review of this specification, the associated drawings and the appended claims.

BRIEF DESCRIPTION OF THE DRAWINGS

FIG. 11a is a side elevational view showing an alternative embodiment of the invention in a towing configuration for towing behind an ATV and FIG. 11b is a top view corresponding to FIG. 11a.

DETAILED DESCRIPTION OF PREFERRED EMBODIMENTS

Figure 1:
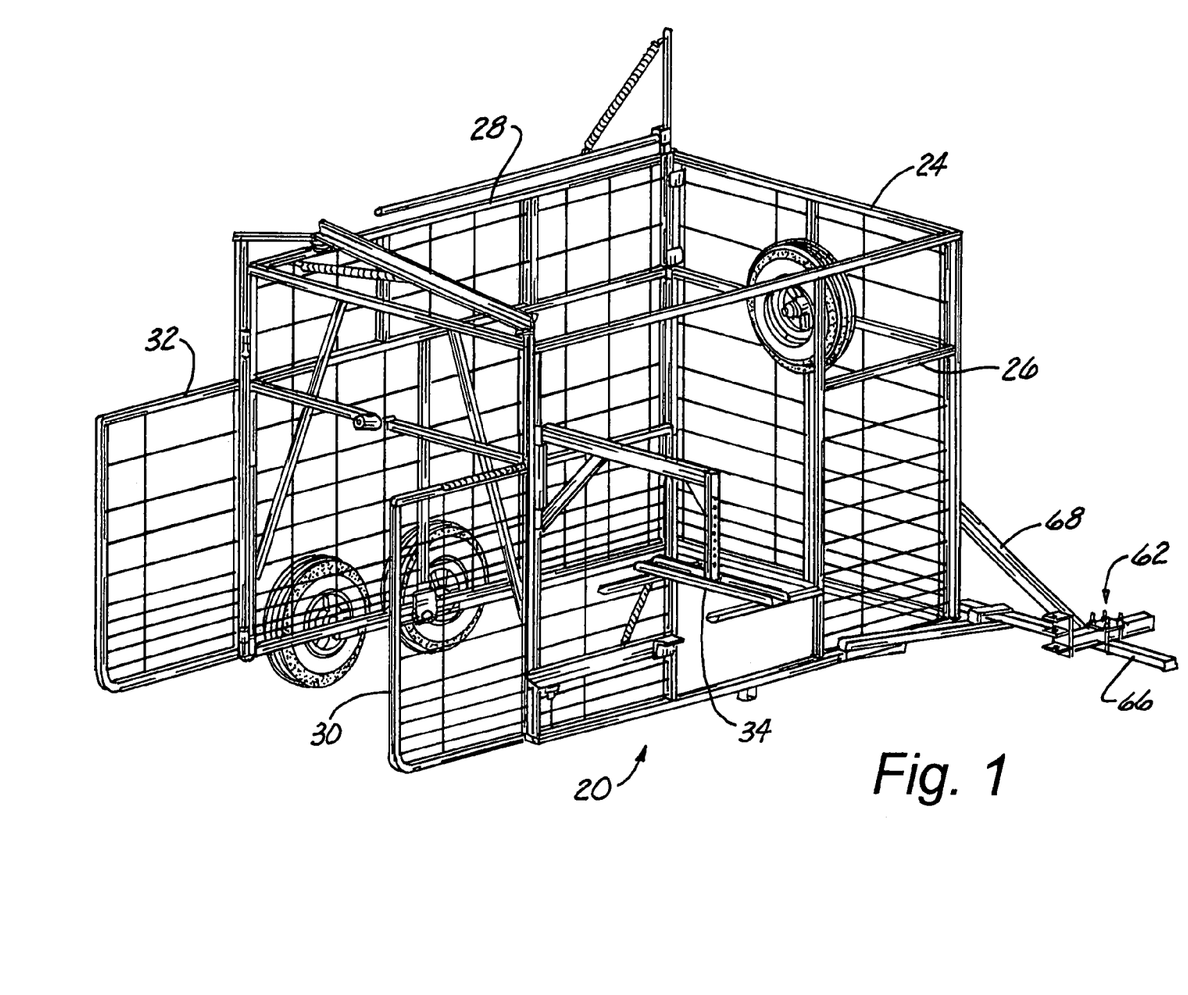
FIG. 1 is a perspective view of the calf catching apparatus of the present invention.
Figure 2:
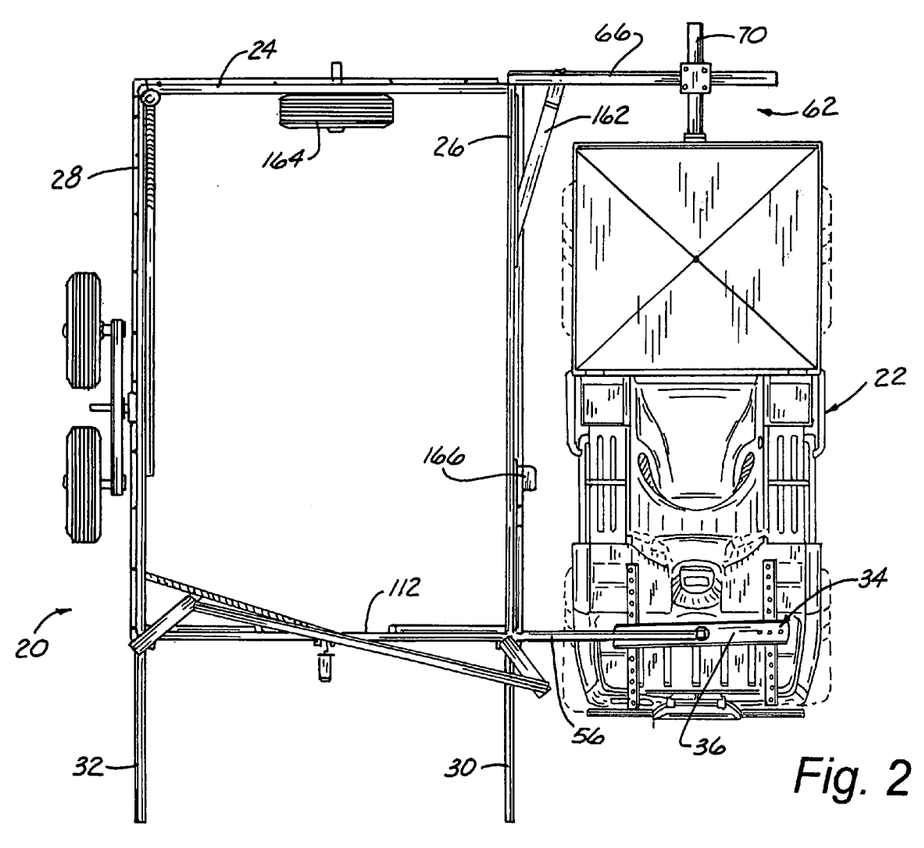
FIG. 2 is a top view corresponding to FIG. 1, wherein the calf catching apparatus is shown mounted on an all-terrain vehicle.
Figure 6:
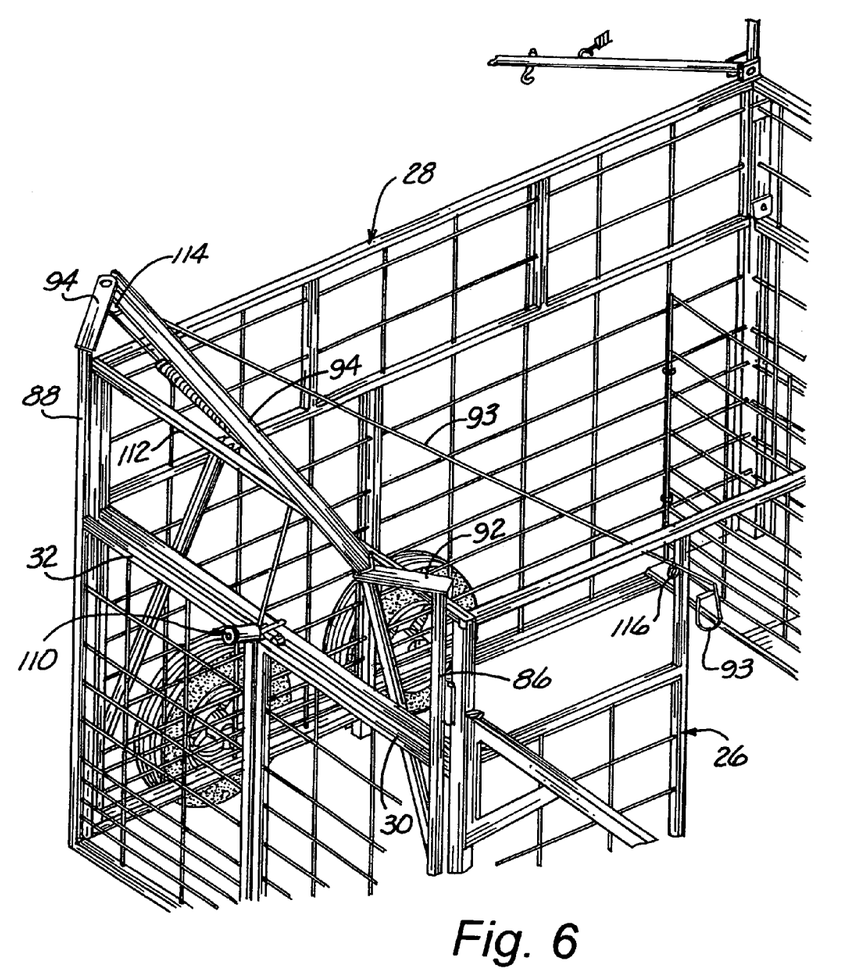
FIG. 6 is a front view of the calf catching apparatus showing the rope and pulley arrangement for releasing and opening the front doors of the apparatus.

Referring to FIGS. 1 and 2, there is illustrated, generally at 20, a calf catching apparatus mounted on a vehicle 22 (FIG. 2), which in the preferred embodiment is an all-terrain vehicle (ATV), for transportation of the calf catching apparatus 20 alongside the vehicle 22. The calf catching apparatus 20 includes a substantially box-shaped pen, having four vertical walls or panels, rear panel 24, vehicle-adjacent side panel 26, opposite side panel 28, and a front panel which is comprised of two doors, vehicle-side door 30 and opposite-side door 32. The panels and doors are constructed of combination panels or the equivalent to provide a safe and secure enclosure for a calf and yet permit easy visibility for both the operator and for the cow and calf. The doors 30 and 32 are mounted to the front of the corresponding side panels, 26 and 28, respectively, on hinges for pivotal movement about vertical axes between an open position (FIGS. 1 and 2) and a closed position (FIG. 6).

Figure 3:
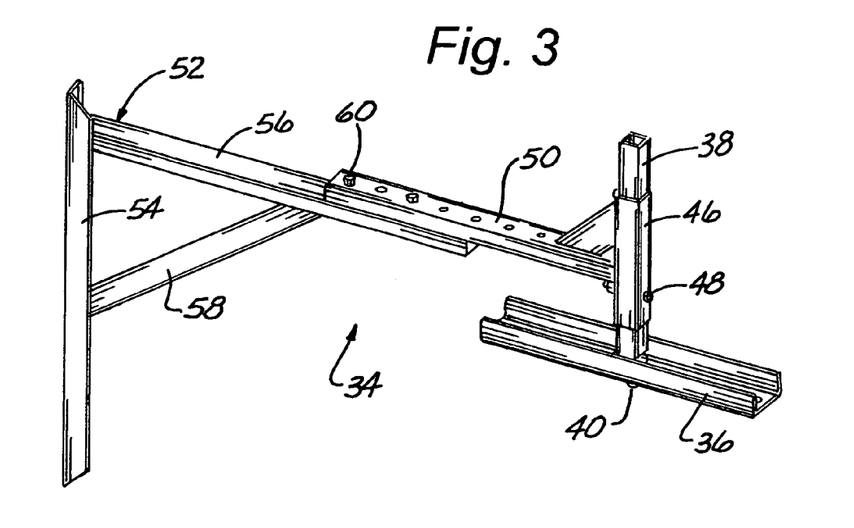
FIG. 3 is an enlarged perspective view of a front mounting assembly.
Figure 4:
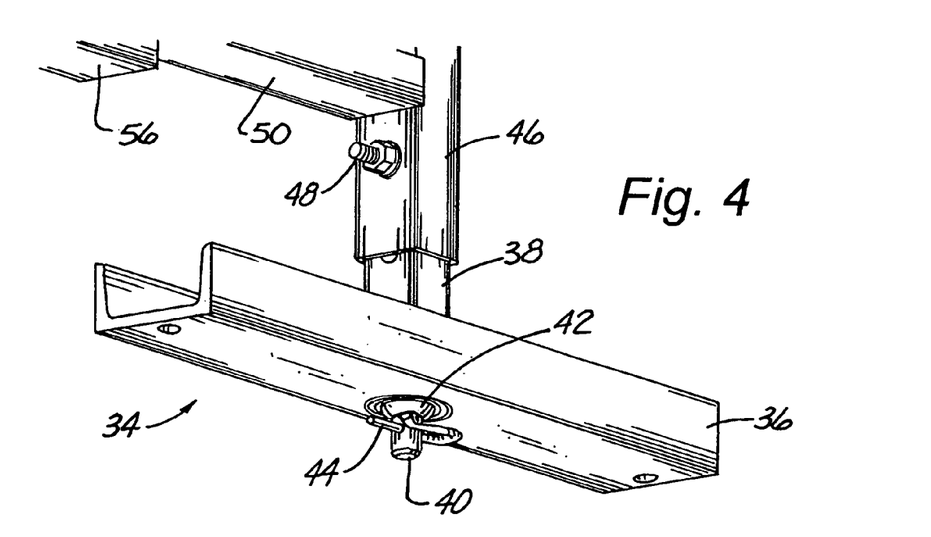
FIG. 4 is an enlarged perspective view of the front mounting assembly of FIG. 3, showing the underside of a ball joint that allows for pivotal movement of the calf catching apparatus relative to the ATV.

The calf catching apparatus 20 is mounted to the ATV 22 at forward and rearward positions so as to balance the weight and forces of the apparatus 20 evenly on the ATV 22. A forward mounting assembly 34 (FIG. 3) includes a U-shaped mounting bar 36 that is secured by threaded attachments or the like to a position on the ATV 22 forwardly of the operator's position. An upright post 38 includes a pin 40 that is received in a ball receiver 42 of the mounting bar 36 (FIG. 4). A cotter pin 44 prevents the pin 40 from being dislodged from the ball receiver 42. The upright post 38, accordingly, is free to pivot and tilt through the range of motion of the ball receiver 42. A mounting sleeve 46 is received in sliding engagement about the upright post 38. Both the sleeve 46 and upright post 42 have a set of corresponding, equally spaced openings that can be aligned by sliding the sleeve 46 relative to the upright post 38. Nut and bolt combinations 48 received in aligned openings are used to secure the sleeve 46 at a desired height on the upright post 38 and so provides a means of adjusting the height of the calf catching apparatus 20 relative to the ATV 22, thus accommodating vehicles of different sizes and heights. A bar 50 is secured to the sleeve 46 and extends transversely toward the calf catching apparatus 20.

The forward mounting assembly 34 also includes a mounting arm 52 consisting of a vertical bar 54, a horizontal bar 56, and a brace 58. The vertical bar 54 is attached to the vehicle side panel 26 of the calf catching apparatus 22, either by weldments or threaded fasteners, or the like, or by a hinge and pin assembly to permit pivotal motion of the forward mounting assembly 34 relative to the pen of the calf catching apparatus 20. Both the bar 50 and the horizontal bar 56 have a set of corresponding, equally space openings that can be aligned by sliding the horizontal bar 56 in line with and beneath the bar 50. Nut and bolt combinations 60 received in aligned openings are used to secure the bar 50 at a desired position relative to the bar 56 to thereby allow for adjustment of the spacing of the pen of the calf catching apparatus 20 relative to the ATV 22.

Figure 5:
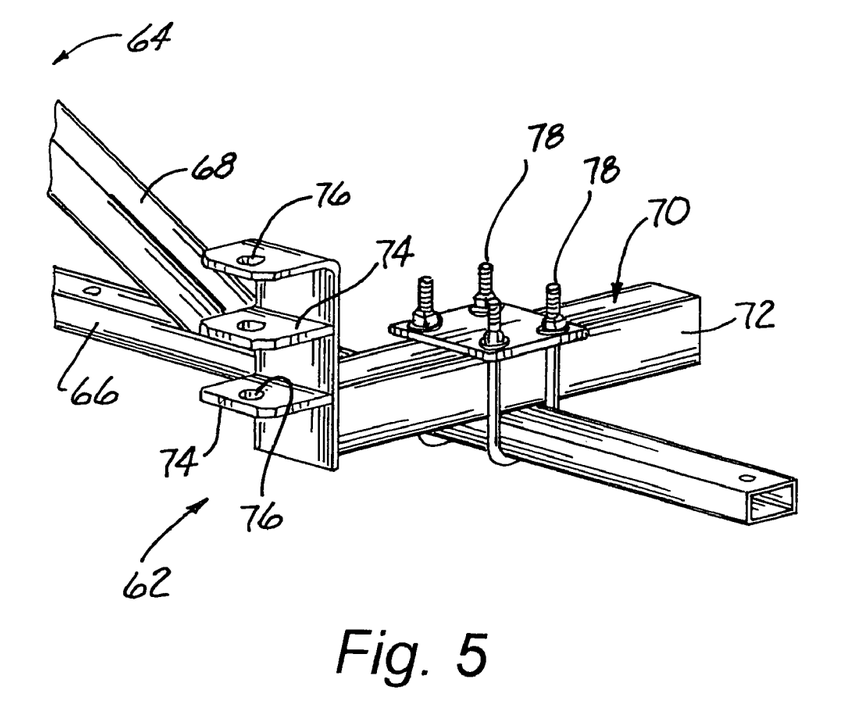
FIG. 5 is an enlarged perspective view of a rear mounting assembly.

The calf catching apparatus 20 is mounted to the rear of the ATV 22 by a rearward mounting assembly 62 (FIG. 5). The rearward mounting assembly 62 includes a vertical bar 64, a horizontal bar 66, and a brace 68. A hitch bar 70 includes a rearwardly extended bar 72 to the front of which is mounted a plurality of hitch plates 74 having vertically aligned openings 76 which are used to releasably attach the hitch bar 70 to the hitch of the ATV 22 in the conventional manner using a hitch pin (not shown). The hitch bar 70 is thus free to rotate relative to the ATV 22 about the aligned axis of the openings 76. A pair of U-bolts 78 are used to secure the horizontal bar 66 at any desired position on the hitch bar 70, thus providing a means of infinite adjustment of the longitudinal and transverse position of the rearward mounting assembly 62 within the range permitted by the lengths of the hitch bar 70 and horizontal bar 66, respectively, to accommodate a wide variety of sizes of vehicles.

In addition to being mounted on the ATV 22, the calf catching apparatus 20 is also supported for rolling movement over the ground on a gimbal-mounted wheel assembly 80 attached centrally at the lower edge of the opposite side panel 28 (FIG. 1). The wheel assembly 80 includes a pair of wheels 82 and 84 that are mounted on a bar equidistant from a central mounting pin (not shown) that is received for pivotal movement in the side panel 28. Accordingly, the gimbal-mounted wheel assembly 80 will allow for improved rolling of the wheels 82 and 84 over rough or irregular terrain.

It will be appreciated that the mounting of the calf catching apparatus 20 on the ATV 22 by the forward and rearward mounting assemblies 34 and 62, together with the gimbal-mounted wheel assembly 80 permit a range of unrestricted movement of the calf catching apparatus 20 relative to the ATV 22 so as to accommodate variations in the level and slope of terrain as well as displacements of the calf catching apparatus 20 relative to the ATV 22 that may be induced by surface irregularities, acceleration, deceleration, and the like. In adjusting the mounting assemblies, it is important that there be sufficient ground clearance of the pen above the terrain to permit relatively unrestricted travel over the desired terrain without being so high as to allow a calf captured in the pen to escape under the pen.

The doors 30 and 32 operate in a coordinated fashion, opening and closing together. Each of the doors 30 and 32 are mounted on a pivot rod 86 and 88, respectively, that is received for pivotal movement about a vertical axis in tubes attached to the forward edge portions of the side panels 26 and 28, respectively (FIGS. 1 and 2). The upper ends of the pivot rods 86 and 88 are interconnected by a linkage arm 90 and a pair of connecting links 92 and 94. The connecting link 92 is secured at a fist end portion to the top of the pivot rod 86 and is pivotally attached at its opposite end portion to a first end of the linkage arm 90 and, correspondingly, the connecting link 94 is secured at a fist end portion to the top of the pivot rod 88 and is pivotally attached at its opposite end portion to a second or opposite end of the linkage arm 90. In this way, pivotal motion of one of the doors will pivot its pivot tube, which will in turn pivot the corresponding connecting link to push (or pull) on the linkage arm and thereby pivot the other door. The connecting links 92 and 94 have an orientation that is 90° from the other so that clockwise pivotal movement of one of the doors will result in counterclockwise pivotal movement of the other door. A spring is held in tension between the side panel 28 and a central location on the linkage arm 92 and thereby biases the doors 30 and 32 toward their closed position. The doors 30 and 32 can be opened by an operator seated at the ATV by pulling on a rope 93 that extends from a door latch assembly 110, through an eye on a front cross bar 112, through a pulley 114 mounted below the junction of the linkage arm 92 and the link 94, and through an eye 116 on the side panel 26. By pulling on the rope 93, the operator can overcome the closing force exerted by the spring 95 and cause the linkage arm 86 to pivot the doors 30 and 32 toward the open position by way of the links 88 and 90.

Figure 8:
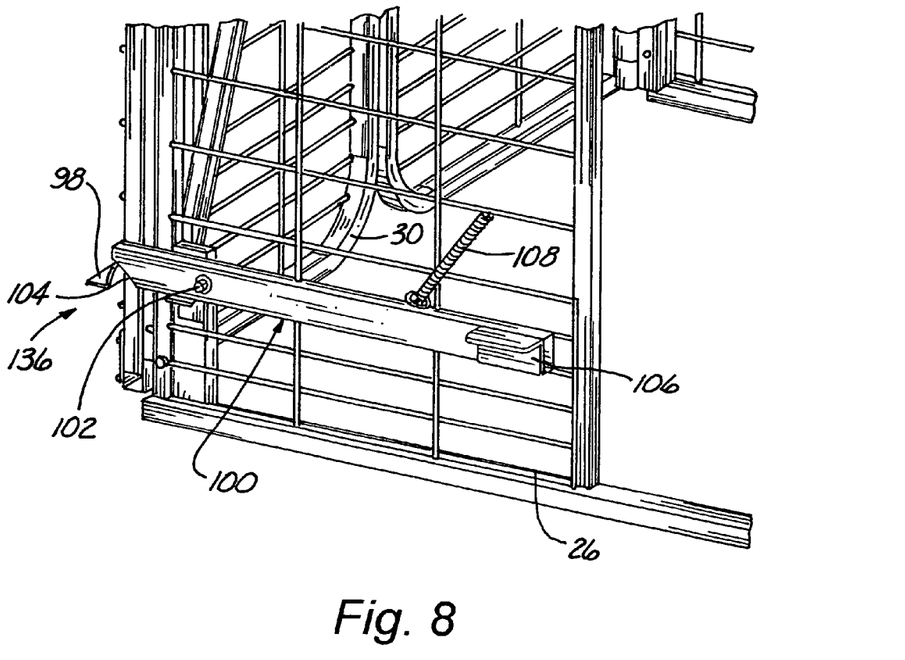
FIG. 8 is an enlarged perspective of a foot pedal for use by an operator in closing the doors.

A foot-released latch 96 (FIG. 8) is provided on the ATV-adjacent side panel 26 for holding the doors 30 and 32 in their full open positions. An L-shaped strike member 98 is mounted horizontally on the door 30 adjacent the side panel 26. A foot lever 100 is mounted horizontally on the side panel 26 at the same height as the strike member 98 and can be pivoted about an axis at 102. The foot lever 100 has a forward end portion 104 in front of the axis 102 and a pedal 106 rearward of the axis 102. A spring 108 biases the foot lever 100 toward its horizontal position. In operation, the forward end portion 104 contacts the vertical portion of the strike member 98 as the door 30 is pivoted toward the open position. The end portion 104 is cut at an upwardly sloping angle so the end portion 104 is urged upwardly by the strike member 98, extending the spring 108. As the door 30 reaches its full open position, the forward end portion 104 will slip past the vertical portion of the strike member 98 whereupon the spring 108 will force the forward end portion 104 onto the horizontal portion of the strike member 98 to thereby hold the door 30 in the full open position. Because the door 32 is in coordinated movement with the door 30, it will also be held in its full open position. The doors 30 and 32 will quickly return to their closed positions if the operator depresses the pedal 106 to raise the forward end portion 104 above the strike member 98.

Figure 7:
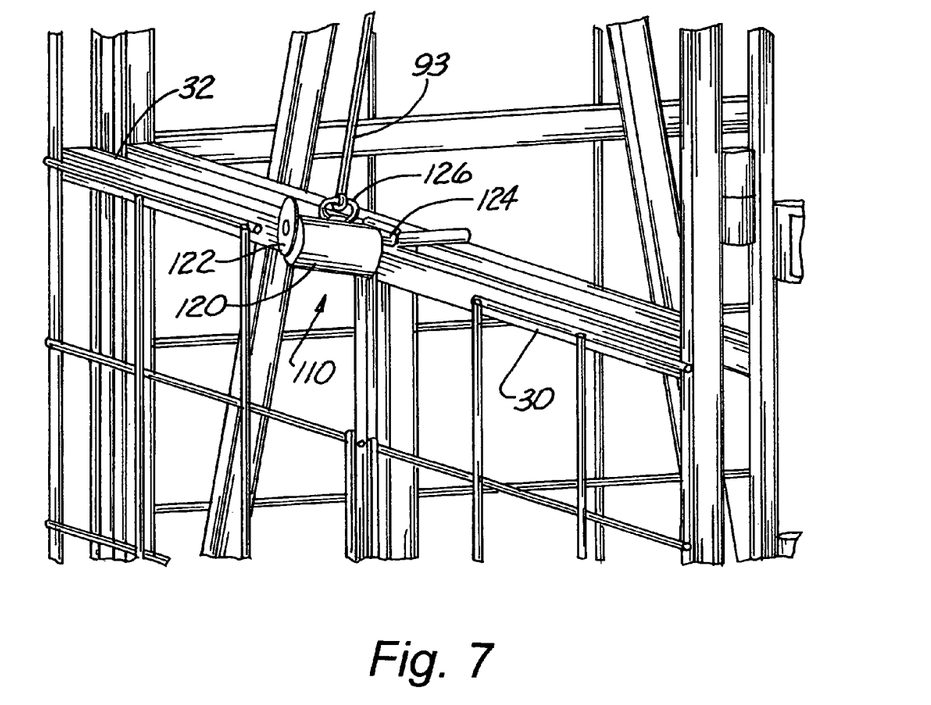
FIG. 7 is an enlarged front view of the latch for holding the doors in a closed position.

The latch assembly 110 includes tube 118 that is loosely captured on a tilted rod 120 between a front plate 122 and a rear bar 124 (FIG. 7). The inside diameter of the tube 118 is larger than the diameter of the rod 120 and so it normally falls by gravity to a position as illustrated in FIG. 7 where it is resting on the rod 120 and the rear bar 124. In this position, when the doors 30 and 32 are closed, the lower edge of the tube 118 extends in front of the tope edges of the doors 30 and 32. If a calf inside the pen were to try to push the doors 30 and 32 open, the tube 118 would be moved forwardly, but only until it contacted the front plate 122 and so the doors 30 and 32 are prevented from being opened. The operator can release the latch assembly 110, however, by pulling on rope 94, the end of which is attached to an eye 126 secured to the tube 118. Tension is the rope 94 will lift the tube 118 up against the tilted rod 120, raining the lower edge of the tube 118 above the top edges of the doors 30 and 32 so that retraction of the rope 94 will cause the doors 30 and 32 to open simultaneously as described previously.

In operation, the ATV 22 is maneuvered to first isolate the targeted calf and then to position the calf inside the pen. The operator then releases the foot latch 96 to close the doors 30 and 32, which are held in their closed position by the latch assembly 110. An opening in the ATV-adjacent side panel 26 will allow access by the operator into the pen but the height of the ATV 22 will prevent the calf from escaping the pen.

Figure 9:
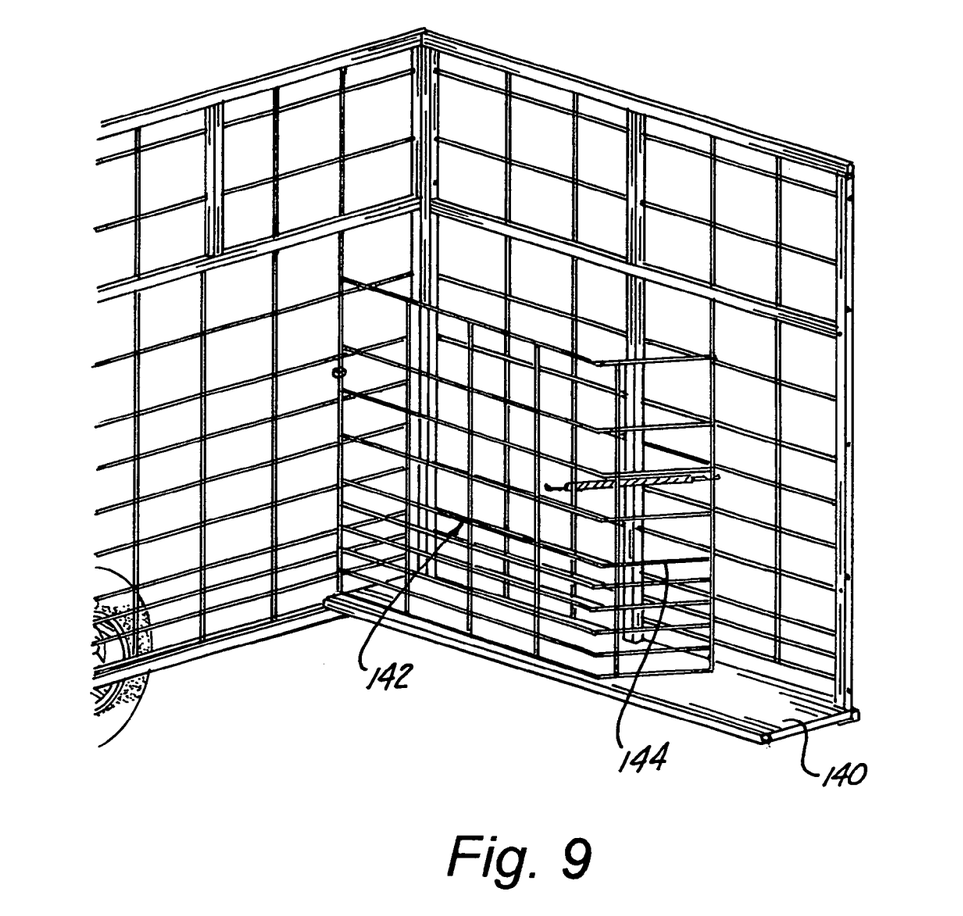
FIG. 9 is a perspective view of a platform and gate for use in supporting a calf in the apparatus for transport.

The calf catching apparatus may preferably include a transporting platform 140 and gated enclosure 142 mounted to the inside of the pen (FIG. 9). A calf that has been captured is lifted onto the platform 140 and the gate 144 closed to restrain the calf in a supported position on the platform 140. The calf can then more quickly be transported to a remote location. Because the cow and her calf can still see each other, the cow will follow along as the calf is transported to the desired location.

Figure 12:
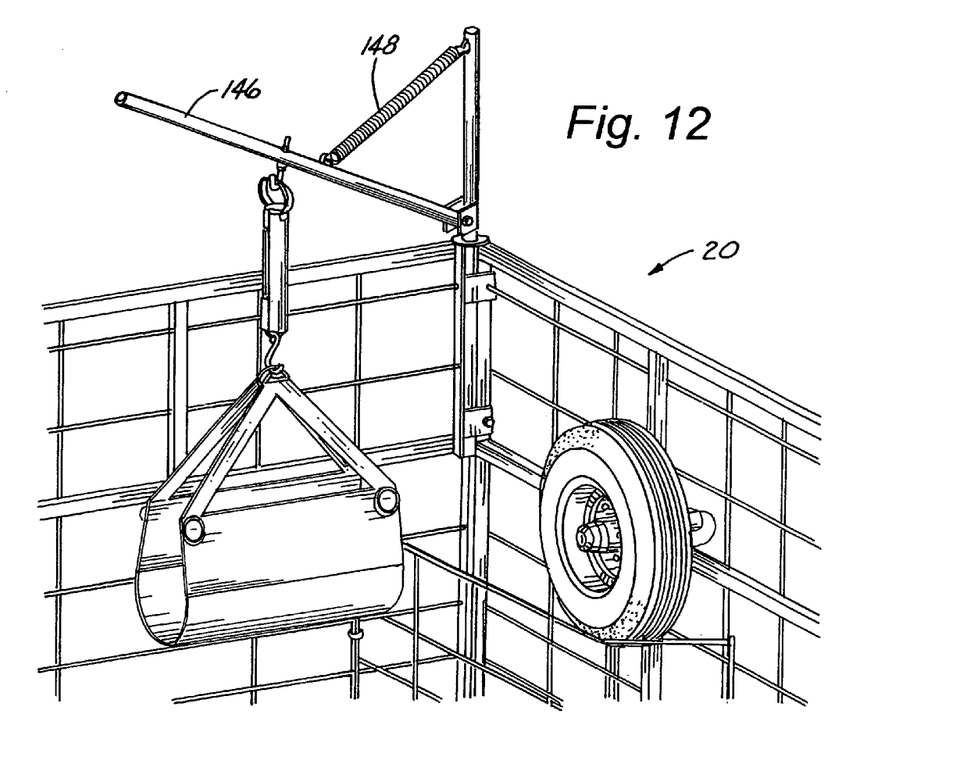
FIG. 12 is a perspective view of a scale and sling arrangement mounted on the calf catching apparatus for weighing a calf captured in the apparatus.

A common operation to be carried out on newborn calves is to weigh them. For this purpose, the calf catching apparatus 20 may preferably include a scale 150 and sling 152 (FIG. 12). A hand-operated lift arm 146 is pivotally attached at a first end portion to a top portion of the calf catching apparatus 20 for pivotal up and down movement by an operator grasping the second or opposite end portion of the lift arm 146. The sling 152 is suspended from a central portion of the lift arm 146 through the scale 150. The operator places the calf in the sling 152, attaches the sling to the scale 150 and raised the calf off the ground using the lift arm 146. The scale 150 is then read to provide the weight of the calf. A spring 148 keeps the lift arm 146 out of the way when not in use.

Figure 10A:
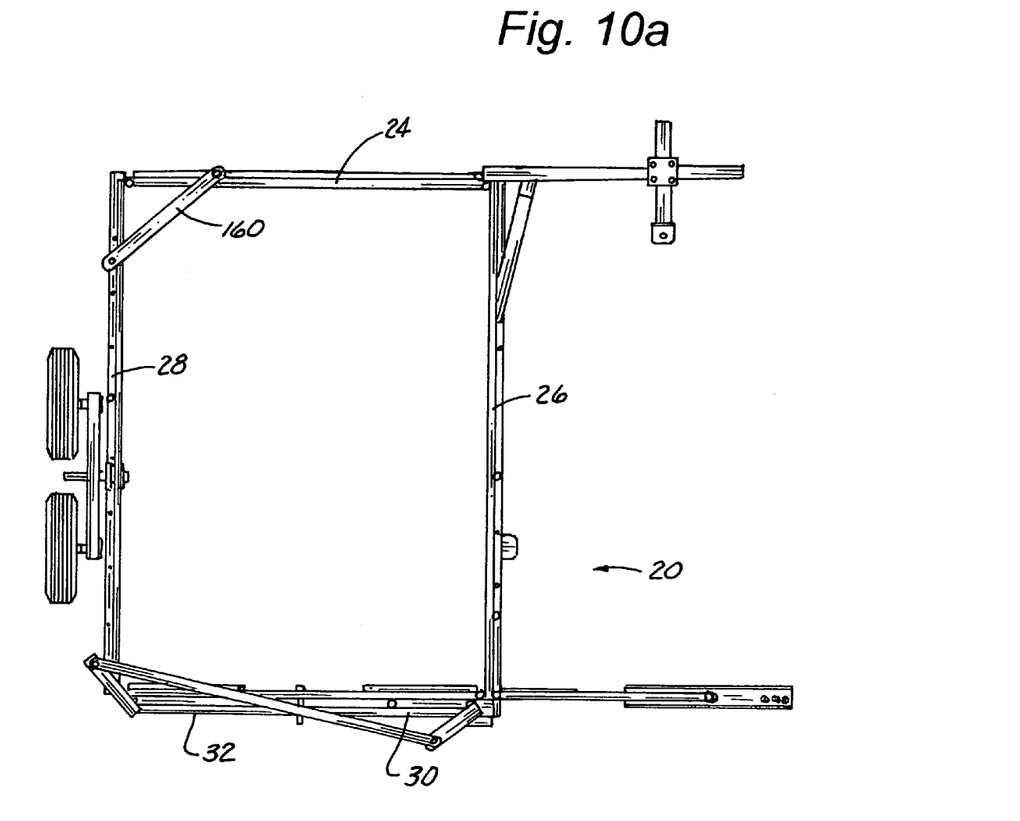
FIGS. 10a-c are top views of an alternative embodiment of the calf catching apparatus that is foldable to a collapsed, transport condition, FIG. 10a showing the apparatus in a fully open or expanded condition, FIG. 10b showing the apparatus in a partially folded condition and FIG. 10c showing the apparatus in a fully folded condition.
Figure 10B:
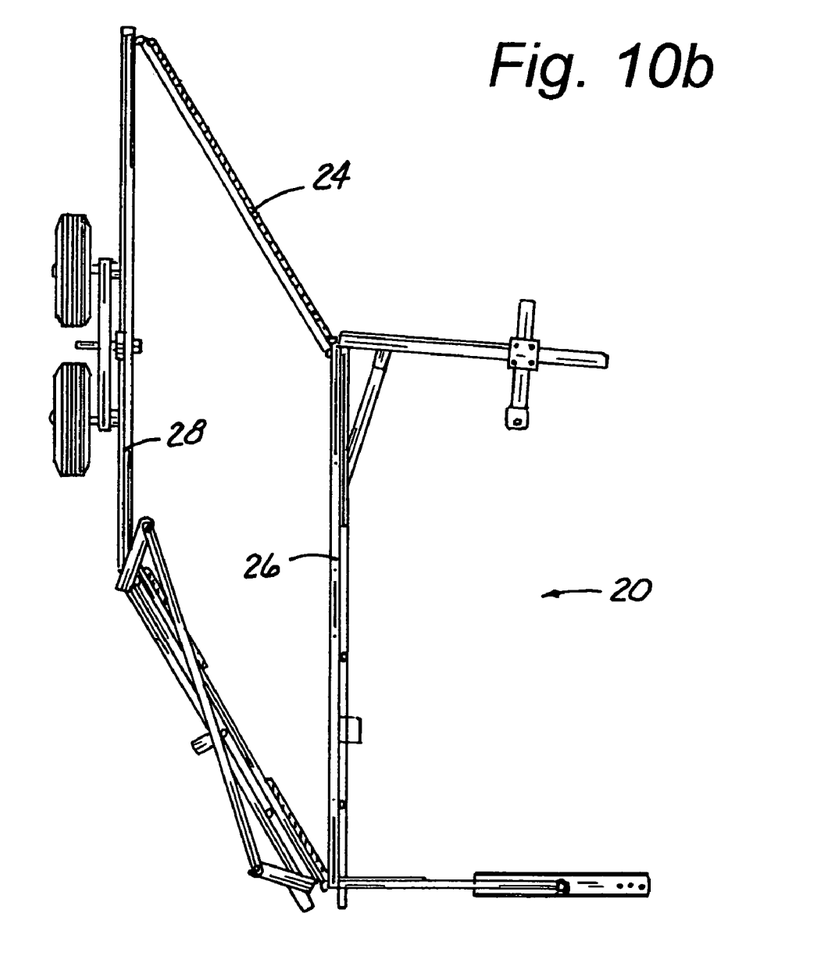
Figure 10C:
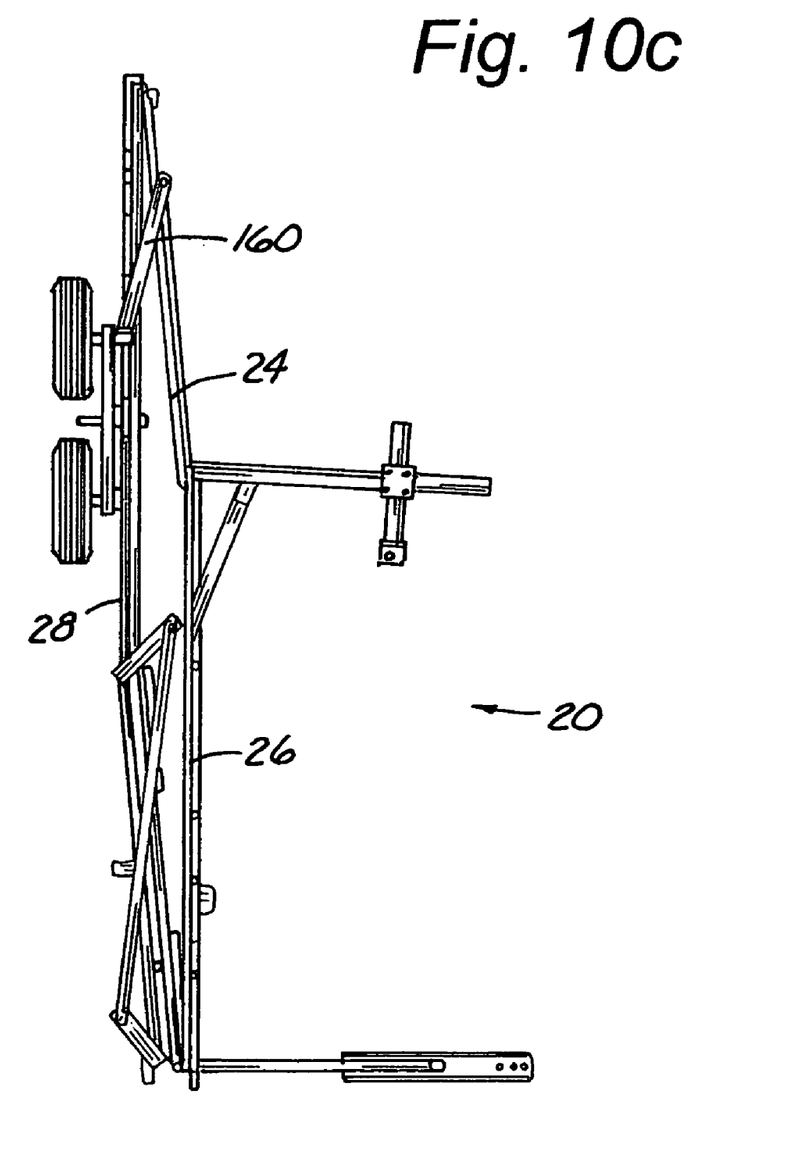

In a preferred embodiment, the calf catching apparatus 20 is collapsible to a reduced width so as to facilitate passage to the ATV 22 with the attached calf catching apparatus 20 through gates, down narrow roads, and the like (FIGS. 10a-c). The apparatus 20 in its fully open or expanded, working condition is illustrated in FIG. 10a. The side panels 24, 26, and 28, and the front panel to which the doors 30 and 32 are mounted are all pivotally connected at their junctures so that the panels may pivot relative to each other. A rigid strap 160 is releasably attached between the rear panel 24 and the side panel 28 to secure the apparatus 20 in its working condition. To collapse the apparatus 20, the strap 160 is removed from the panels 24 and 28 and the panel 28 is moved rearwardly and toward the opposite panel 26, as illustrated in FIG. 10b. Upon full collapse of the apparatus 20 to the condition illustrated in FIG. 10c, the strap 160 is reattached to the rear panel 24 in the same position, but attached to the side panel 28 at a new, forwardly adjusted position whereupon it secures the apparatus 20 in the fully collapsed condition.

Figure 11A:
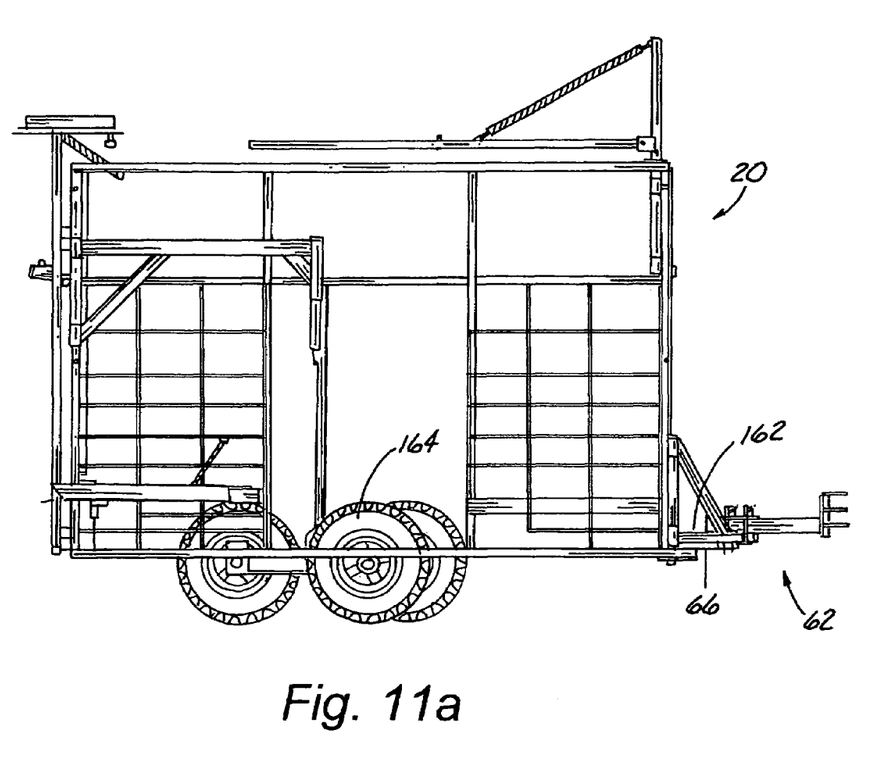
Figure 11B:
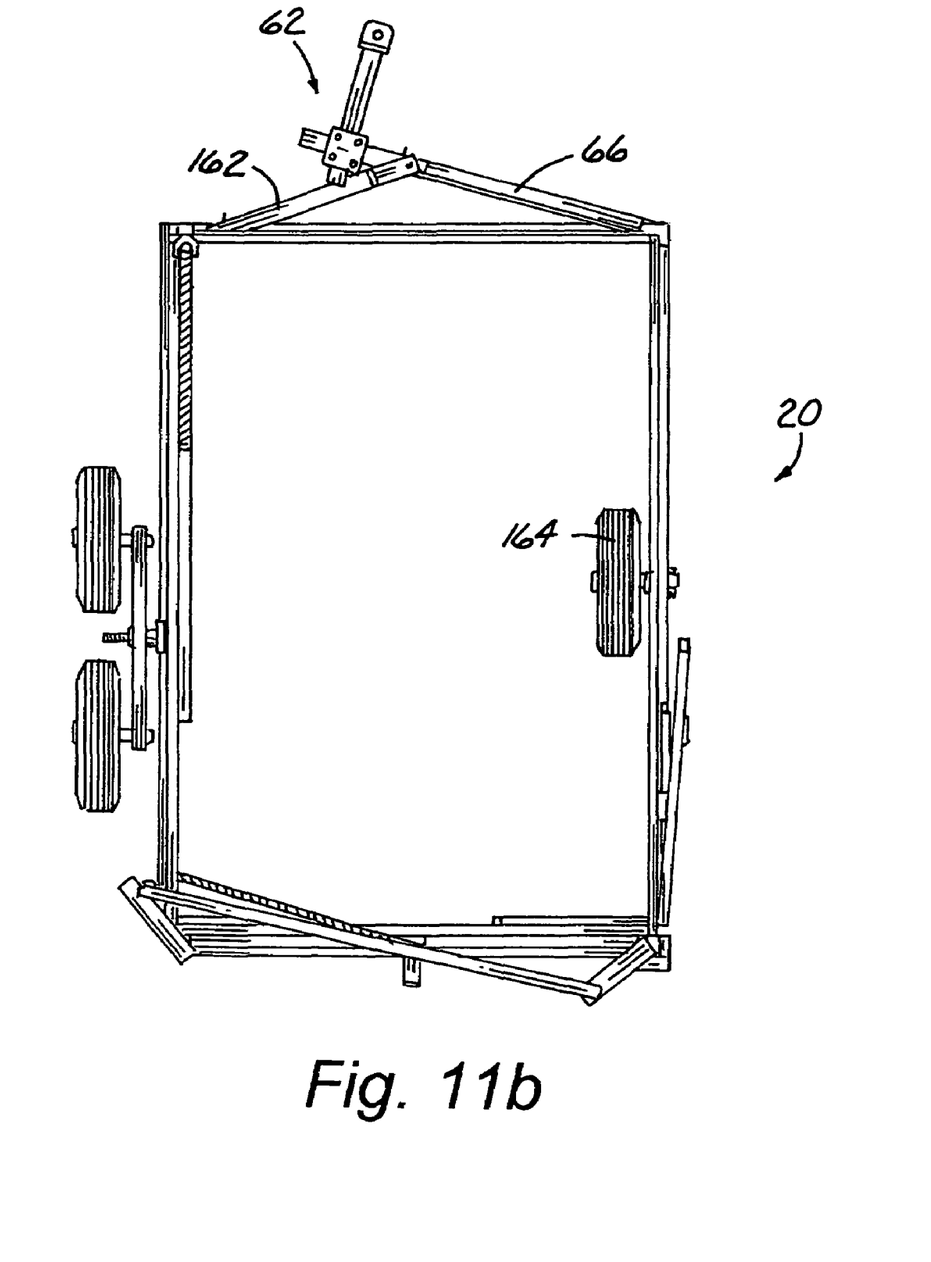

In another preferred embodiment for reducing the width of the ATV 22 and calf catching apparatus 20 combination, the calf catching apparatus 20 is adapted for being towed behind the ATV (FIGS. 11a and 11b). Referring to FIG. 2, the horizontal bar 66 of the rearward mounting assembly 62 is oriented perpendicularly to the side panel 26 in its working condition. In the alternative embodiment, the horizontal bar 66 is pivotally attached to the corner of the pen so that it may be swung to a position generally rearwardly of the apparatus 20, as illustrated in FIGS. 11a and 11b. A tongue brace 162 is releasably attached between horizontal bar 66 and either the side panel 26 (FIG. 2), where it holds the rearward mounting apparatus 62 in the working position, and the rear panel 24 (FIGS. 11a and 11b), where it holds the rearward mounting apparatus in the tow-behind position. In addition, a third wheel 164 is moved from a storage position (FIG. 2) to a mounting position 166 on the side panel 26 (FIGS. 11a and 11b) to support that side of the apparatus 22 as it is towed behind the ATV.

Figure 13:
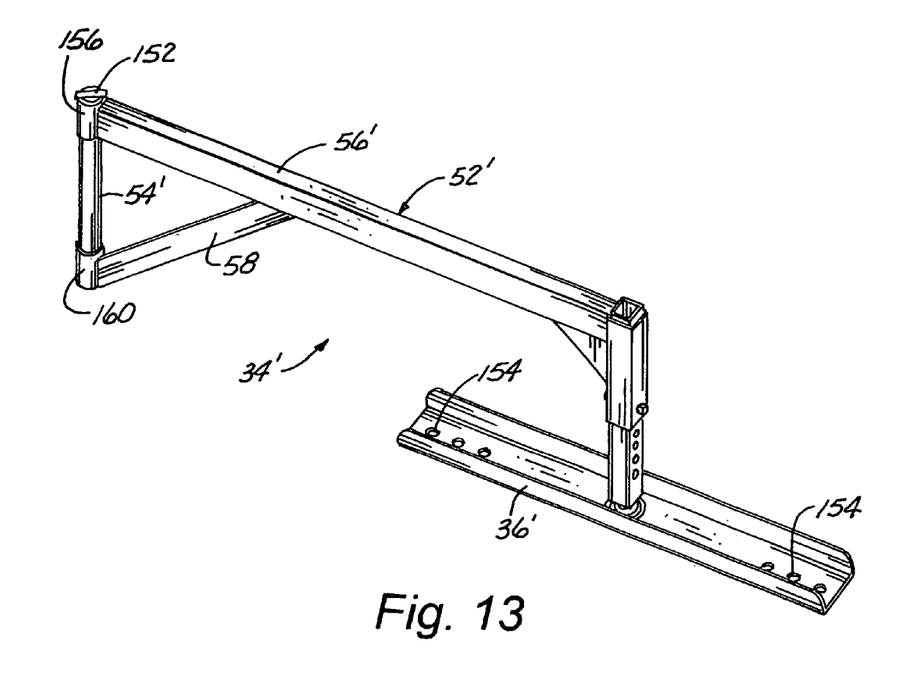
FIG. 13 is an enlarged perspective view of an alternative embodiment of the front mounting assembly.

In an alternative embodiment, the forward mounting assembly has been modified so that it can be swung between a working position generally perpendicular to the side panel 26 and a storage position parallel to and alongside the side panel 26 used when transporting the calf catching apparatus 20 behind the ATV 22. The modified forward mounting assembly 34' is illustrated in FIG. 13. It has been modified by the use of a vertical tube 54' to which the horizontal bar 56' and the brace 58 are attached for pivotal movement by a pair of tube sections 156 and 160, respectively. A latch 158 is provided to lock the position of the forward mounting assembly 34' in the desired working or storage position. Note that method of adjusting the length of the mounting assembly 34' has also been modified by including a plurality of attachment holes 154 in the mounting bar 36' and eliminating the length adjustment feature provided by the bar 50, openings in 50 and 56, and nut and bolt combinations 60. The plurality of attachment holes 154 permit the alternative forward mounting assembly 34' to be mounted on the forward end of the vehicle 22 at a plurality of adjusted lateral positions thus effectively changing the distance the distal end of the mounting assembly 34' extends from the side of the vehicle 22.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A portable enclosure attached to a ground vehicle for capturing and retaining an animal, comprising:
   (a) a pen supported adjacent the ground on the vehicle adjacent a side of the vehicle;
   (b) a wheel attached to the pen to assist in supporting the pen adjacent the ground;
   (c) a forward facing opening in the pen through which an animal enters the pen;
   (d) a door operable to close the opening to retain the animal inside the pen; (e) a forward mounting assembly comprises a vertical adjustment linkage to accommodate the height of the vehicle and a horizontal adjustment linkage to accommodate the length of the vehicle wherein the forward mounting assembly connected to a forward portion of the pen to assist in mounting the forward portion of the pen to a forward portion of the vehicle; (f) a rearward mounting assembly comprises a vertical adjustment linkage to accommodate the height of the vehicle and a horizontal adjustment linkage to accommodate the length of the vehicle wherein the rearward mounting assembly connected to a rearward portion of the pen to assist in mounting the rearward portion of the pen to a rearward portion of the vehicle; and (g) the forward mounting assembly and the rearward mounting assembly support the pen centrally on the vehicle.

2. A portable enclosure as defined in claim 1, wherein the pen has openings that permit viewing of an animal inside the enclosure.

3. A portable enclosure as defined in claim 1, further comprising a second pen mounted on the pen for supporting a captured animal above the ground.

4. A portable enclosure as defined in claim 1, wherein said door comprises a pair of doors and further comprising linkage interconnecting the doors so that the doors open and close in coordinated movement.

5. A portable enclosure as defined in claim 2, further comprising means for biasing the door toward its closed position.

6. A portable enclosure as defined in claim 5, further comprising a releasable latch for holding the door against the biasing means in its open position, whereupon release of the latch the biasing means forcibly closes the door.

7. A portable enclosure as defined in claim 1, wherein the mounting assemblies pivot relative to the vehicle.

8. A portable enclosure as defined in claim 1, wherein the enclosure is folded between a working position having an open pen and a collapsed position wherein the pen has been eliminated.

9. A portable enclosure as defined in claim 1, wherein release of the forward mounting assembly from the vehicle permits movement of the pen to a trailing position behind the vehicle.

* * * * *